United States Patent [19]

Rubio

[11] 4,162,558

[45] Jul. 31, 1979

[54] FISH SCALER TOOL

[76] Inventor: Carlos R. Rubio, 650 NW. 59 Ave., Miami, Fla. 33126

[21] Appl. No.: 910,374

[22] Filed: May 30, 1978

[51] Int. Cl.² ............................................. A22C 25/02
[52] U.S. Cl. .......................................................... 17/67
[58] Field of Search .............................. 17/64, 66, 67

[56] References Cited

U.S. PATENT DOCUMENTS

| | | | |
|---|---|---|---|
| 2,655,689 | 10/1953 | Witte | 17/67 |
| 2,875,642 | 3/1959 | Colburn | 17/67 X |
| 3,072,956 | 1/1963 | Olrich | 17/67 |
| 3,872,544 | 3/1975 | Lange | 17/67 X |

*Primary Examiner*—Willie G. Abercrombie

[57] ABSTRACT

A fish scaler tool for use with a motor driven drill having a chuck means which includes a first end to connect to the chuck means and a second end having an elongate solid stainless steel body of generally cylindrical form with a plurality of axially extending spiral grooves which are equally spaced from one another extending therealong and a plurality of teeth formed by radially inwardly extending forwardly facing recesses at the line of intersection of the spiral grooves and the surface of the tool so that when the tool is rotated rapidly, fish will be scaled upon contact with the fish surface and the tool surface.

1 Claim, 2 Drawing Figures

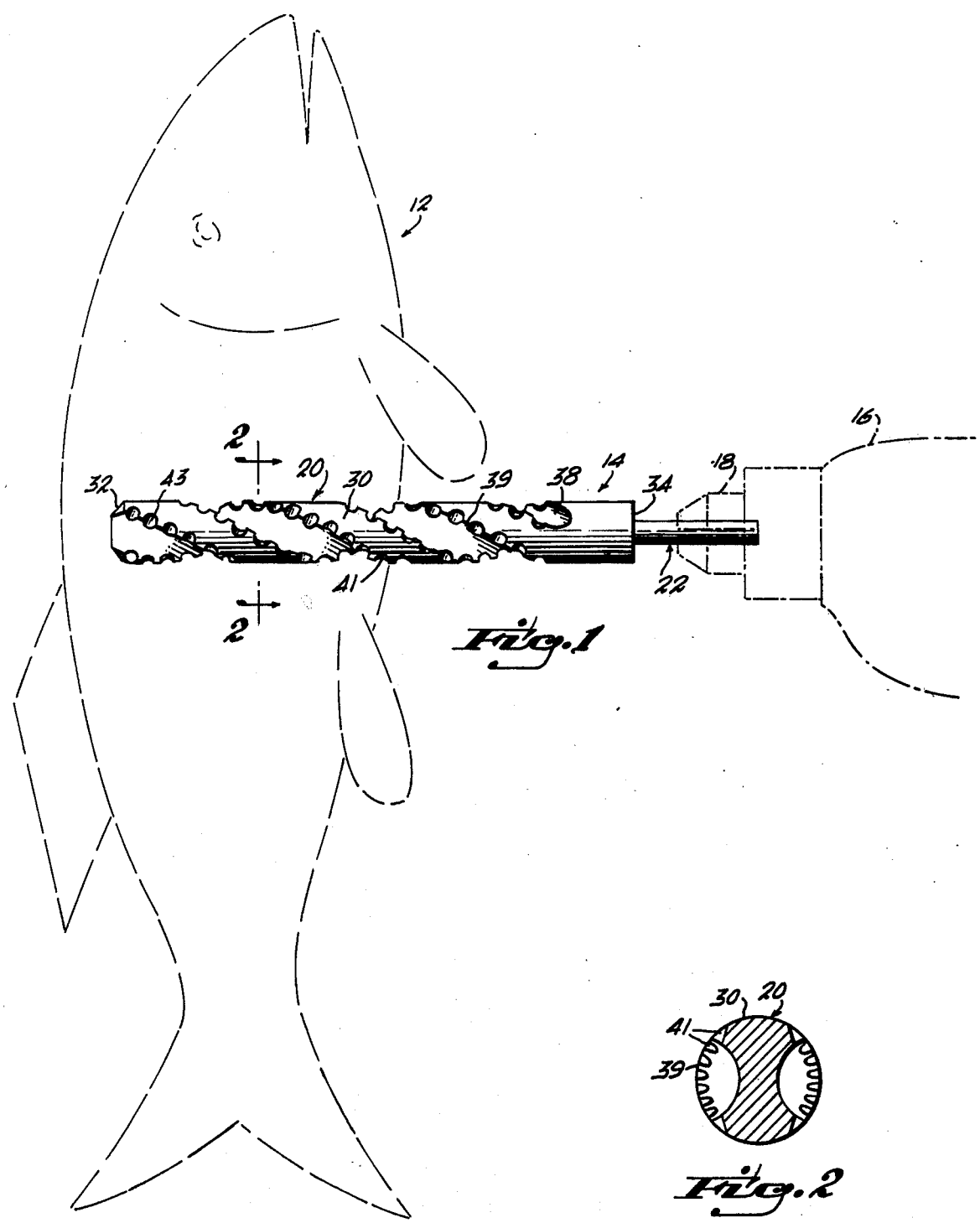

FISH SCALER TOOL

FIELD OF THE INVENTION

This invention relates to a fish scaler which is adapted to be motor driven.

BACKGROUND OF THE INVENTION

In the past the problem of scaling fish has been repeatedly addressed in the art. There have been numerous types of fish scaling tools for use in conjunction with an electric drill, for example, to cause the tool to rotate rapidly about a longitudinally extending axis so that irregularities in the surface of the tool will be adapted to scrape the scale from a fish. This invention, generally, is of such a tool and constitutes an improved tool for use in scaling fish.

Representative prior art includes U.S. Pat. No. 2,655,689 comprising an elongate tool to be connected to a motor driven device wherein the scaling teeth are formed by punching the same or chiseling the material so as to arrange a row of radially outwardly projecting teeth from the tool surface with the same being arranged in staggered fashion along the tool length; U.S. Pat. No. 2,875,642 is of a generally threaded tool to be connected as a motor driven drill and wherein a shield is provided to protect the operator from flying particles in the scaling operation; U.S. Pat. No. 3,016,564 is of a scaling device of the type described wherein a shield is provided to protect against flying fish scale; U.S. Pat. No. 3,072,956 is of a fish scaling tool having circular grooves with teeth defined therein with the teeth defining a tangential surface and wherein the tool is manufactured of plastic material; U.S. Pat. No. 3,156,276 is of a paring tool for fleshy vegetables and is composed of a member having longitudinally extending grooves defining a brink edge of the groove and the surface of the tool; and U.S. Pat. No. 3,872,544 is of a tool which is hollow with a plurality of rows and columns of holes in the wall of the tool to define teeth at the brink edge of the holes and the surface of the teeth.

OBJECTS OF THE PRESENT INVENTION

It is an object of the present invention to provide a relatively small tool for scaling fish which is adapted to be attached to the chuck of a motor driven drill and which is composed of solid stainless steel and includes a relatively thin elongate member having equispaced longitudinally extending spiral grooves therealong defining a brink edge at the zone of juncture with the spiral groove and the exterior surface of the tool and wherein along the lines of juncture of the spiral groove and the surface and in the line of juncture most closely adjacent the chuck engaging end of the tool, recesses are provided which extend radially inwardly and are generally of semi-circular form so that there is formed a three-sided tooth at the two intersections of each recess at the zone of juncture, the recesses being equispaced along the lines of juncture of the spiral grooves and the exterior surface defining a large number of relatively small three-sided sharp teeth for fish scaling and wherein the tool is adapted to reach all areas of the fish without causing the scales removed to fly so that no cover is needed to protect against them and additionally which permits substantial removal of all of the scale from a fish and which is easy to operate and can be utilized with a low energy using motor.

In accordance with these and other objects which will become apparent hereinafter, the instant invention will now be described with reference to the accompanying drawings in which:

DESCRIPTION OF THE DRAWINGS:

FIG. 1 is a side elevational view of the fish scaler tool of the present invention illustrating its use in scaling a fish; and FIG. 2 is a vertical cross sectional view taken along line 2—2 of FIG. 1.

DESCRIPTION OF THE PREFERRED EMBODIMENT:

Referring to the drawing, there is shown a fish generally designated by the numeral 12 to be scaled, a tool 14, to be described, for scaling the fish and a motor driven drill 16 having chuck means 18, the same being shown in dotted line, to engage the tool in the manner now to be described. In use, when the tool is connected to the chuck of a motor driven drill it is adapted to turn rapidly so that teeth on the tool will remove scales from the fish 12.

Generally speaking, the fish scaler tool 14 is for use with such a motor driven drill and it includes a generally elongate cylindrical member of solid stainless steel having a first end zone 20 and a second end zone 22. The second end zone comprises an axially extending chuck engageable length of about 3/16 inch diameter being sized to mate with the chuck means 18 of the drill. The first end zone has an exterior surface 30 and is of about 4 inches in overall length from a beveled terminal end 32 to the juncture with the second end zone comprising the chuck engaging length. The overall diameter of the exterior surface is preferably about ½ inches. Along the length of the tool there are provided a plurality of axially extending equispaced spiral grooves in the exterior surface extending between the beveled end 32 and terminating at 38 adjacent the end 34 of the second end zone. It will be seen that there is thus defined along each groove an edge such as that designated by the numeral 39 which faces the beveled terminal end 32 at a line of intersection along each of the spiral grooves at the exterior surface. Along these lines of intersection, which are equispaced and extend spirally about the body, a plurality of equispaced radially inwardly extending recesses, such as that designated by the numerals 41 and 43 are provided and these recesses in addition to extending radially inwardly are generally semi-circular in form and extend radially depthwise toward the second end zone and away from the beveled end 32. It is thus seen that the surface of the tool is provided with a plurality of tooth surfaces at the zone of juncture of the lines of intersection with the grooves and recesses so that, when the tool is turned rapidly, the edges of the teeth, there being two for each recess, will cyclically impact upon a fish surface to scale it rapidly.

What is claimed is:

1. A fish scaler tool for use with a motor driven drill having a chuck means, said fish scaler comprising:
a generally elongate cylindrical member of stainless steel having a first end zone and a second end zone, said second end zone comprising an axially extending chuck engageable length of about 3/16 inch diameter to mate with the chuck means of the motor driven drill, said first end zone having an exterior surface and comprising a solid elongate body of about 4 inches in length and of about ½ inch in overall diameter of the exterior surface, said first end zone terminating at a beveled terminal end and having a plurality of spiral grooves in the exterior surface extending in equispaced relation between the beveled end to adjacent said first end zone, and each of said grooves defining an edge facing the beveled end along the lines of intersection of the spiral groove at the exterior surface and a plurality of radially inwardly extending recesses of generally semi-circular form extending radially depthwise and toward the first end zone from said lines of intersection, said recesses being equispaced along said lines of intersection and comprising a plurality of integral tooth surfaces on said first end zone whereby, when said motor is energized and said tool is in engagement with the chuck means of a drill driven by said motor, the tool is adapted for use in rapidly scaling fish.

* * * * *